July 13, 1965

W. E. KEMP ETAL 3,194,420

HOPPER STRUCTURE

Filed April 30, 1964

INVENTORS
WILLARD E. KEMP
WILLIAM J. BARBIER

BY

AGENT

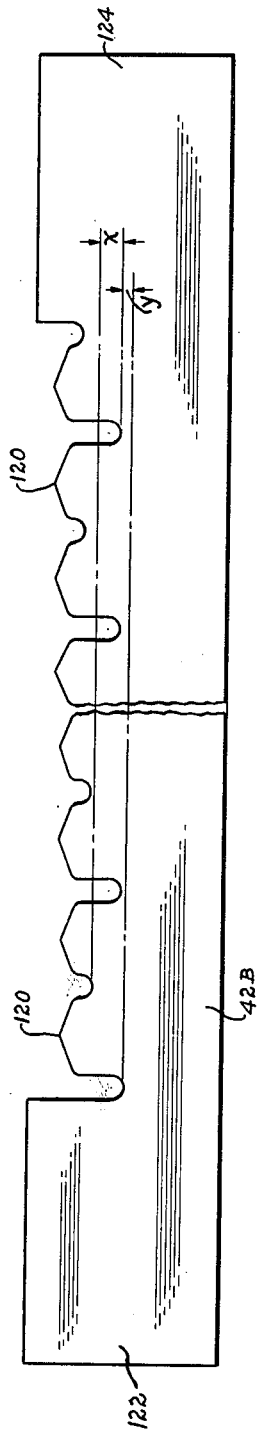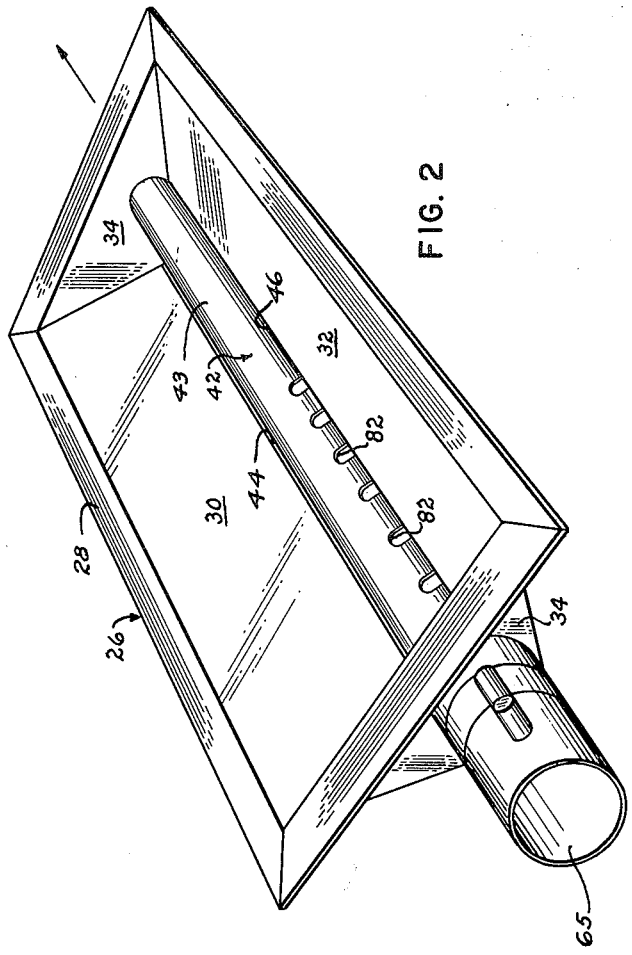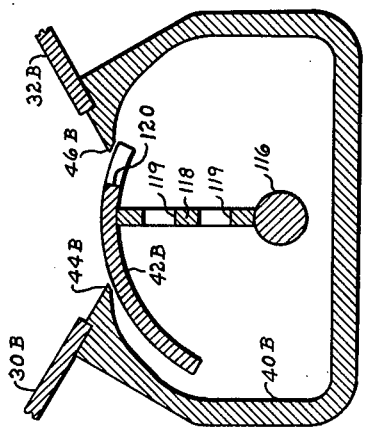

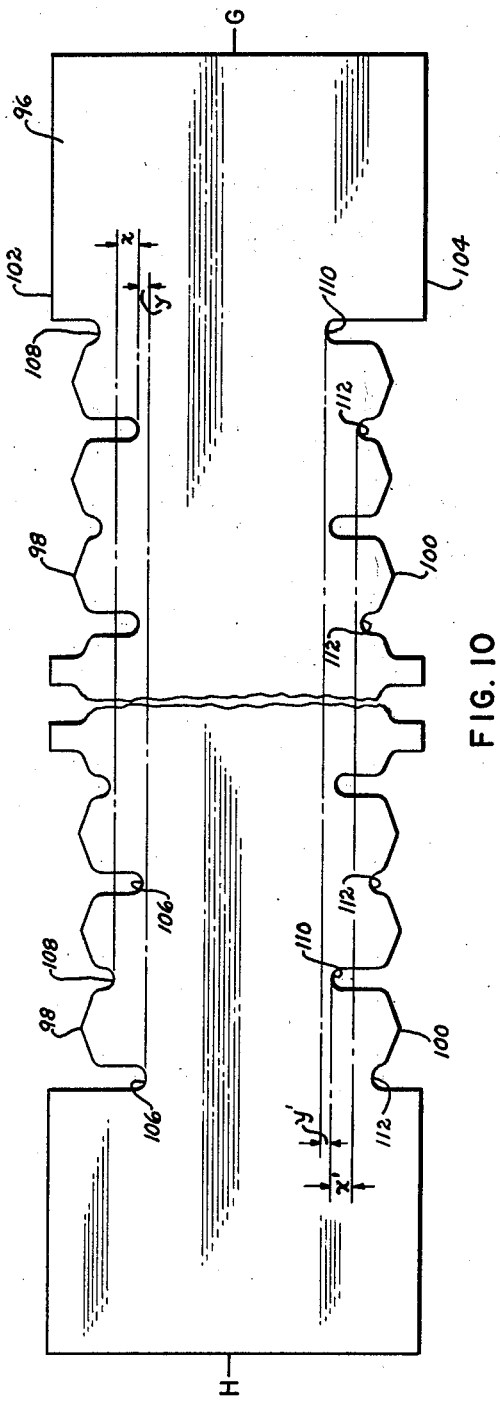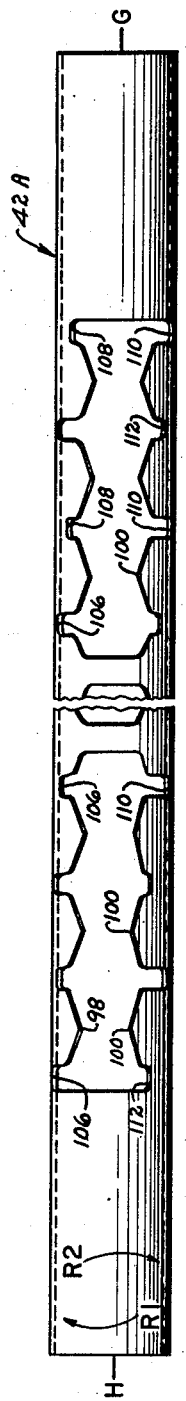

United States Patent Office 3,194,420
Patented July 13, 1965

3,194,420
HOPPER STRUCTURE
Willard E. Kemp, Bridgeton, and William J. Barbier, Overland, Mo., assignors to ACF Industries Incorporated, New York, N.Y., a corporation of New Jersey
Filed Apr. 30, 1964, Ser. No. 363,870
16 Claims. (Cl. 214—83.28)

This invention relates to apparatus for unloading finely-divided materials, and particularly to apparatus for unloading granular or pulverulent particles from a hopper structure. The present application is a continuation-in-part of the joint application of Willard E. Kemp and William J. Barbier, S.N. 272,618, filed April 12, 1963 and entitled Hopper Metering Apparatus.

Several problems occur in apparatus unloading finely-divided particles in which an elongate metering member or valve is positioned adjacent the bottom of a generally trough-shaped outlet structure and the particles are unloaded pneumatically from the bottom of the outlet structure upon movement of the metering valve between open and closed positions. One of these problems is in the rotation of the metering valve from the closed position when a portion of the particles to be unloaded are resting on the upper surface of the metering member. This is especially acute when the elongate metering member is of a relatively long length, such as four or five feet, and a relatively large surface contact area of the metering member is exposed to the particles within the outlet structure. The weight of the particles causes friction between the metering valve and the bearing which support the metering valve. Thus, it is desirable to expose a minimum area of the metering member to the direct weight of the particles to be unloaded.

Another problem encountered in the movement of such a movable metering member is in the binding of particles between the metering member and other portions of the outlet structure upon rotation of the metering member. Such binding resists rotation of the metering valve and causes a relatively high turning torque to be applied. Thus, it is essential that certain clearances be maintained between the metering member and the adjacent outlet structure in order to minimize binding of the metering member upon rotation thereby.

It has been found that a metering member having an irregular surface which forms a side of the opening through which the particles flow to be unloaded permits rotation of the metering member with a minimum of turning torque and a minimum amount of binding. By having an irregular surface formed, for example, by a plurality of projecting teeth along an edge of the metering member, only a portion of the irregular surface is exposed at any one time to the particles until, of course, the metering member is fully open. This tends to minimize binding of the metering member as well as providing a generally uniform unloading.

It is an object of the present invention to provide an outlet structure adapted to be attached beneath the bottom discharge opening of a hopper structure and having a metering valve in the bottom which may be rotated from closed to open positions with a minimum of frictional contact between the metering valve and the particles to be unloaded.

A further object of the present invention is the provision of such an outlet structure having an elongate metering valve in the bottom which is subjected to only a minimum of binding from particles between the metering valve and the outlet structure even though the outlet structure is of considerable length.

An additional object is the provision of an outlet structure having a metering valve which effects a generally uniform unloading of particles within the outlet structure even though the metering valve is of a relatively long length.

Briefly described, the present invention relates to an outlet structure adapted to be attached beneath the bottom discharge opening of a hopper structure, such as in a covered hopper railway car, for example. The outlet structure comprises a pair of oppositely facing side walls sloping downwardly toward each other in a generally smooth relation and having spaced lower end portions, a generally U-shaped housing extending downwardly from the spaced lower portions of the side walls to form a depressed trough bottom, the housing forming a juncture with each of the lower portions which terminates in a lip spaced from the adjacent metering valve with the housing being cut back adjacent each lip, and an elongate metering valve between the lips movable in one direction about a longitudinal axis from a closed position to at least two separate open positions for selectively discharging particles pneumatically from the outlet structure. The metering valve upon rotation forms an opening with at least one of the lips and has an irregular surface disposed adjacent the one lip which extends for at least a substantial portion of the metering valve to expose during the unloading operation an open area which has a varying linear dimension longitudinally of the elongate metering valve at different open positions thereby to minimize binding of the metering valve. The lips form sealing edges with the metering valve and it is desirable to have the lips disposed adjacent the upper portion of the metering valve in order to have only a minimum amount of lading supported directly on the metering valve in closed position.

The invention accordingly comprises the constructions hereinafter described, the scope of the invention being indicated in the following claims.

In the accompanying drawings, in which several possible embodiments of the invention are illustrated, FIGURE 1 is an elevation of a covered hopper railway car illustrating a plurality of hopper structures each adapted to contain pulverulent or granular material to be unloaded pneumatically from an outlet structure secured to the bottom of each hopper structure;

FIGURE 2 is a perspective of one of the outlet structures of FIGURE 1 removed from the hopper car and illustrating the position of the metering valve in one open position;

FIGURE 10 is a top plan of a blank for forming the embodiment of the metering valve illustrated in FIGURE 9;

FIGURE 11 is an elevation of the metering valve of FIGURES 9 and 10 showing the tapering slot arrangement.

FIGURE 12 is a transverse section of another separate embodiment of the metering valve in which the valve member is secured to a shaft for rotation; and FIGURE 13 is a top plan of a blank from which the metering valve of FIGURE 12 may be formed.

Corresponding reference characters indicate corresponding parts throughout the several views of the drawings.

Figure 1:
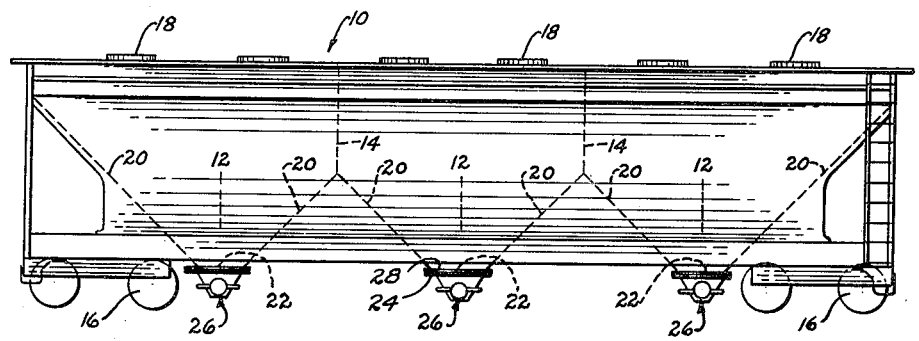

Referring to FIGURE 1 of the drawings, a covered railway hopper car is generally designated 10 and has a plurality of hopper structures 12 separated by partitions or bulkheads 14. A truck assembly 16 is arranged at each end of car 10. Spaced along the top of car 10 are hatch covers 18 for loading of the car with pulverulent, granular, crushed or finely-divided material, such as, for example, plastic pellets, corn, pebbled lime, granulated potash. Hopper sheets 20 of each hopper structure 12 slope downwardly to a bottom opening 22. A peripheral outer flange 24 extends about each opening 22.

Mounted beneath each hopper structure 12 is an outlet structure generally designated 26 for pneumatically unloading material from car 10. As shown in FIGURE 2, each outlet structure 26 has a generally rectangular upper outer peripheral flange 28 adapted to fit against flange 24. Flange 28 is suitably secured, such as by welding, to flange 24.

Outlet structure 26 includes side walls 30, 32 sloping downwardly from flange 28 at an angle of around 30 degrees with respect to the horizontal. End walls 34 extend vertically between walls 30, 32 to form a generally shallow trough-shaped structure. Side walls 30 and 32 have respective lower end marginal portions 36, 38 spaced from each other. Extending between and closing the marginal portions 36, 38 is a generally U-shaped housing generally designated 40 forming a channeled or furrowed bottom for outlet structure 26. Fitting within the U-shaped housing 40 is a metering valve or tube generally designated 42 and having an outer circumferential arcuate surface 43.

Figure 3:
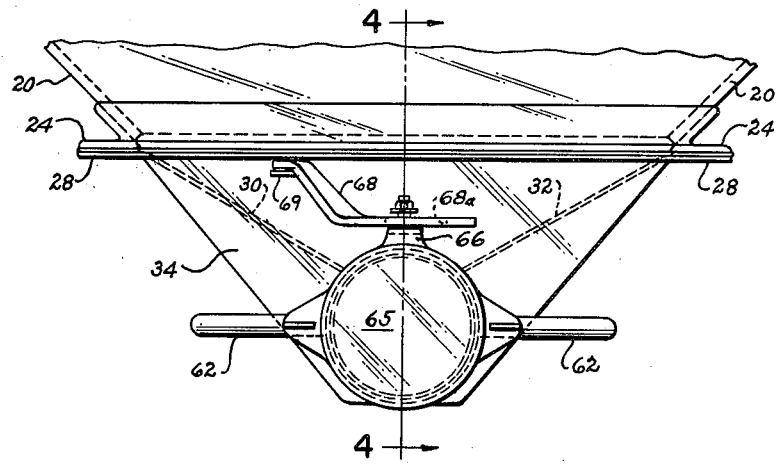
FIGURE 3 is an end elevation of the outlet structure illustrated in FIGURE 2.
Figure 4:
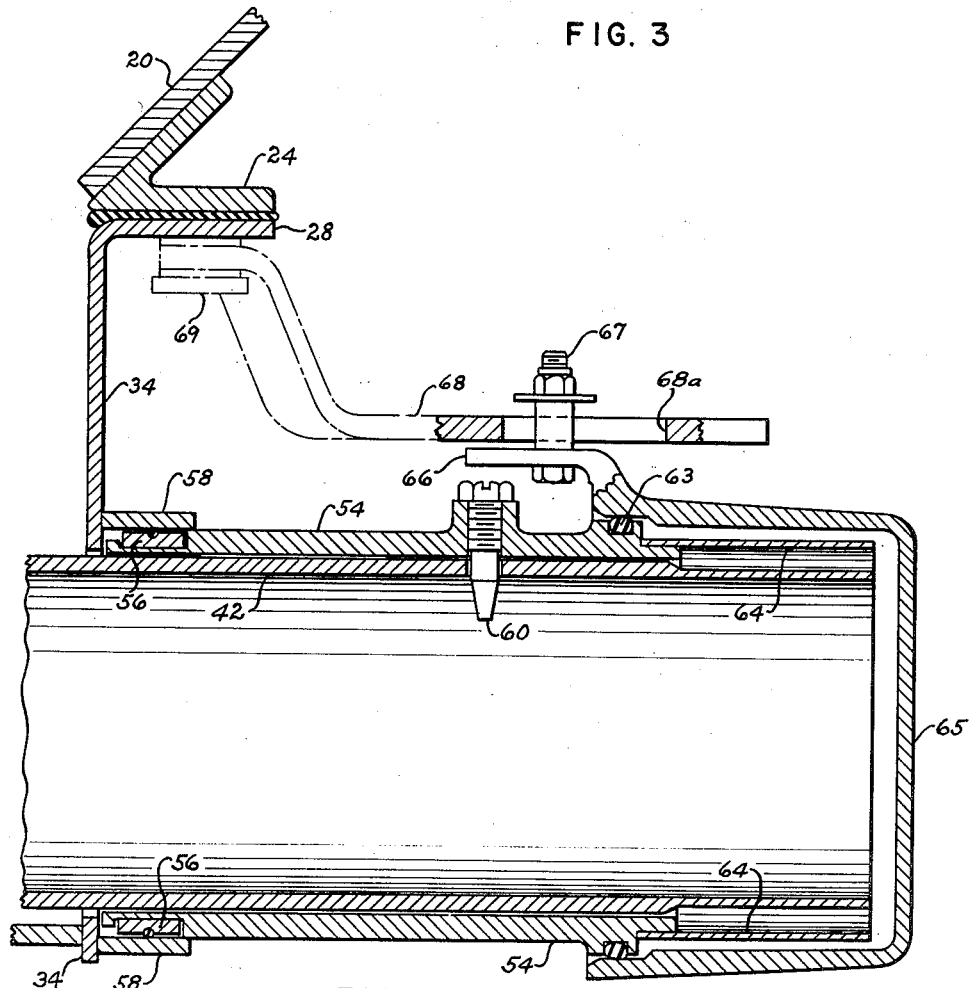
FIGURE 4 is a section taken generally along line 4—4 of FIGURE 3.

Referring to FIGURES 3 and 4, each end of metering valve 42 fits within an outer sleeve 54. Secured to the inner end of each sleeve 54 is an inner bearing ring 56 supported within bearing ring 58 which, in turn, is secured to the adjacent end wall 34. A set screw 60 holds valve 42 and sleeve 54 together for rotation. Extending outwardly from sleeve 54 are handles 62 which may be gripped to rotate tube 42 and sleeve 54. An outer tubular extension 64 is fitted about the outer end of sleeve 54 and is adapted for connection to a vacuum hose or the like (not shown) for pneumatically unloading material from outlet structure 26. An end cap 65 extends about each end of valve 42 to protect the ends of valve 42 and prevent the entrance of moisture or foreign matter. Positioned between end cap 65 and sleeve 54 to provide a seal is an O-ring 63. A support 66 on end cap 65 carries a bolt 67. Pivoted at 69 to flange 28 of outlet structure 26 is a generally Z-shaped member 68 which is slotted at 68a to receive bolt 67 and to permit movement of cap 65 axially of valve 42 for assembly and disassembly. Cap 65 may be removed upon outward longitudinal movement axially of tube 42 with bolt 67 moving relative to the slotted Z-shaped member 68. Cap 65 may be swung away from valve 42 about pivot 69 after being removed from the end of extension 64.

It is to be understood that material within outlet structure 26 may be unloaded from either end of valve 42, as desired. End cap 65 at each end of valve 42 is normally removed when the material is unloaded, air being drawn in valve 42 from one end and material being discharged from the opposite end of valve 42 which is connected to a suitable suction. For further details of the mounting of valve 42, reference is made to aforementioned copending application Serial No. 272,618.

Outlet structures 26 are often four or five feet in length which present difficulties in initially rotating the valve from a closed position where a slot arrangement is provided between metering valve 42 and the adjacent side walls 30, 32 for discharge of the lading. One reason for a high rotational force being required for turning a metering valve is the binding of the particles between the valve and the adjacent side walls as the valve is closed after being opened. The edge defining the slot between side walls 30, 32 and metering valve 42 shears the particles caught at the slot and this requires increased turning torque.

Figure 5:
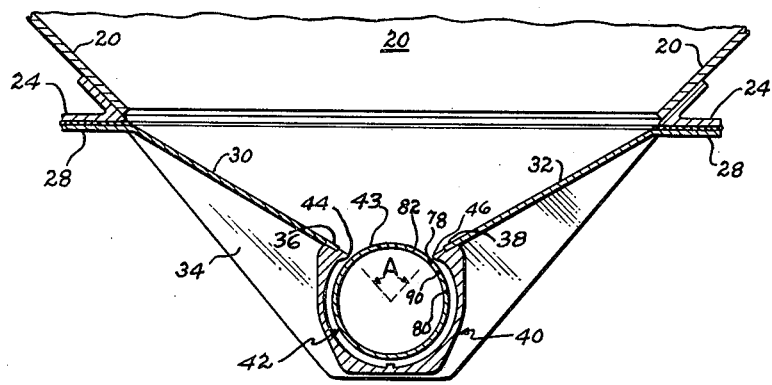
FIGURE 5 is a transverse section of the outlet structure of FIGURE 2.
Figure 6:
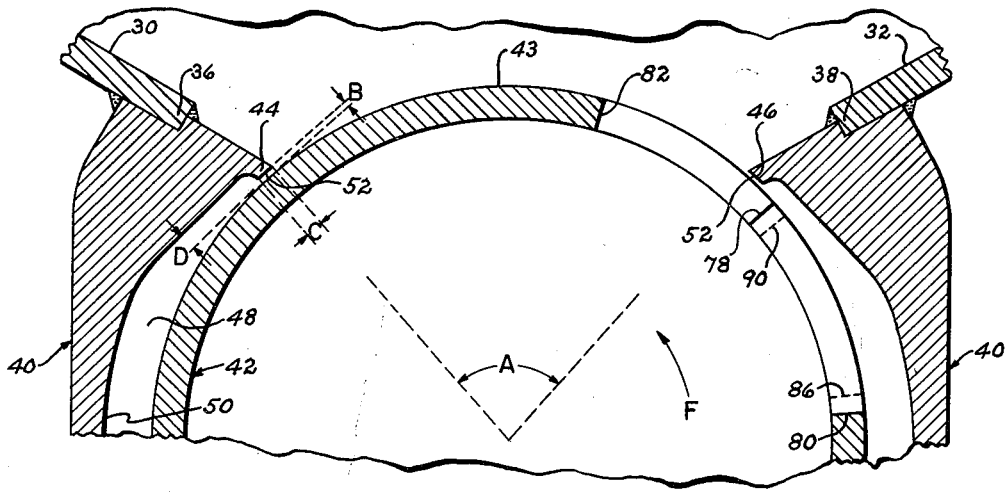
FIGURE 6 is an enlarged fragment of FIGURE 5 showing the upper portion of the metering tube and the adjacent housing structure with the metering valve in the position illustrated in FIGURE 2.

Referring particularly to FIGURE 6 and in accordance with the invention, housing 40 and side walls 30, 32 form junctures terminating in respective lips 44 and 46 adjacent the upper outer surface 43 of metering valve 42. The rotation of valve 42 is resisted by frictional contact of lading supported on the surface 43 of valve 42 between lips 44 and 46. It is desirable to have only a minimum portion of valve 42 in contact with lading within outlet structure 26 particularly if outlet structure 26 is of a considerable length, such as 5 or 6 feet. By having lips 44, 46 adjacent the upper portion of valve 42 only a minimum area of the valve is exposed to the direct weight of the lading. As indicated by angle A in FIGURES 5 and 6 only about 80 degrees of surface 43 of valve 42 is exposed to lading within outlet structure 26. With minimized frictional contact between valve 42 and the lading, the tube may be easily rotated. It is to be understood that angle A may be substantially greater, such as 120°, if desired, with satisfactory results obtained.

To prevent binding of valve 42 as it is being rotated, sufficient dimensions should be provided for the lips depending on the particle size of the material being unloaded. If pulverulent or powdered material of a maximum dimension below 0.010 inch is being unloaded, the lips 44, 46 may be of any suitable dimensions. However, in the event granular or pulverulent material of a maximum dimension over 0.050 inch is being unloaded then the dimensions of lips 44 and 46 should be sufficient to form a sealing edge and to prevent the lading from passing between lips 44, 46 and outer surface 43 of valve 42. For granular or pulverulent material having a minimum particle dimension between about 0.050 inch and 0.250 inch, the distance between lips 44, 46 and surface 43 of valve 42 indicated at B is less than the minimum dimension of the particles and between about 1/64 inch and 1/8 inch. For instance, if the minimum particle dimension is around 0.050 inch, then distance B should be slightly less than 1/32 inch. Inner surface 52 of lips 44, 46 extends generally coaxially to the adjacent surface 43 of metering valve 42 and is of a width indicated at C between about 1/32 inch and 1/8 inch for particles having a minimum dimension between about 0.050 inch and 0.250 inch. It is necessary that lips 44, 46 hold to the minimum a flow of particles into valve 42 when it is closed. If the clearance B between lips 44, 46 and valve 42 were approximately equal to the particle size then the particles would tend to move into this area and be carried between the lips when the valve is rotated thereby causing binding of the valve. Since some particles in all pulverulent materials are very fine, there will be some particles that will pass lips 44, 46 but the amount will be at a minimum. If dimension C is very small only very fine particles will pass lips 44, 46.

Housing 40 is cut back adjacent the lips to a distance D at least about 3/32 inch from the adjacent surface 43 of metering valve 42 and generally around two to five times as great as dimension B. While inner surface 50 of housing 40 defining area 48 need not be uniformly spaced from the metering tube, a minimum clearance between surfaces 43 and 50 of at least about 3/32 inch is required to prevent binding of valve 42 in the event lading is in the space formed between surfaces 43 and 50. If the clearance between valve 42 and housing 40 is about the same as the particle size or smaller, the particles will be dragged slightly when valve 42 is rotated and will pack tightly between the valve and the inner surface of housing 40 causing a relatively high friction. Thus, it is desirable that the clearance between valve 42 and housing 40 be substantially larger than the particle size so that the particles will tend to adjust amongst themselves and will not extrude or pack tightly.

Figure 7:
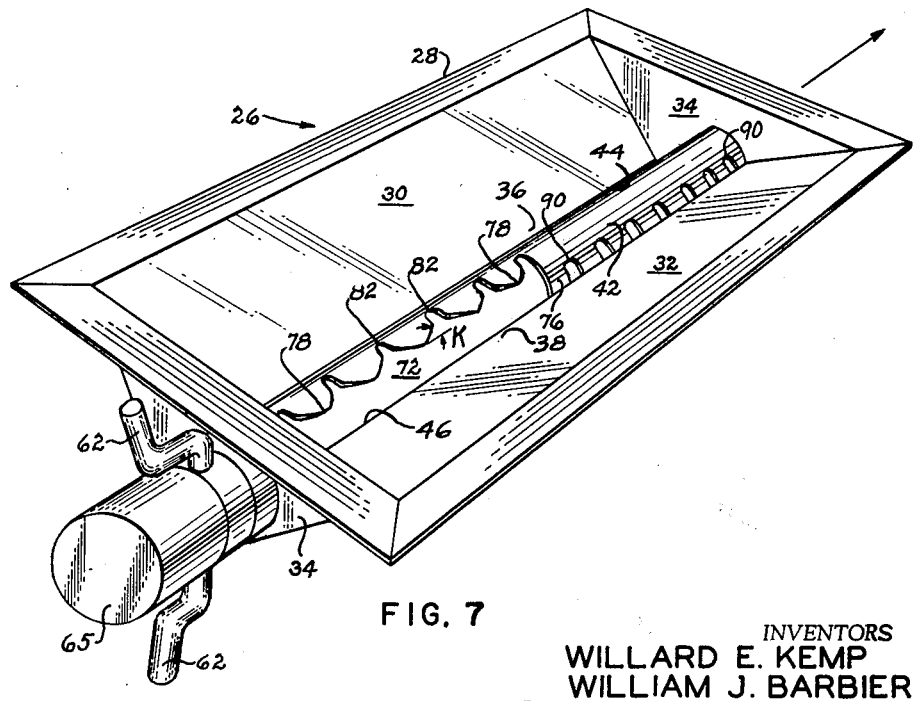
FIGURE 7 is a perspective similar to FIGURE 2 but showing the metering member in another open position.
Figure 8:
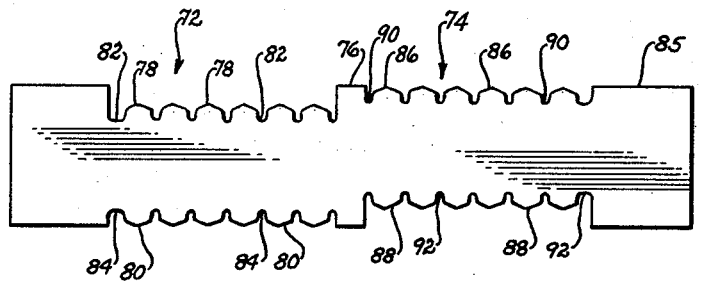
FIGURE 8 is a top plan of a blank from which the metering tube illustrated in FIGURES 1–7 may be formed.

To minimize the length of metering valve 42 exposed to the slot area at any one time, a slot arrangement defined by oppositely facing irregular surfaces is illustrated in FIGURES 7–8. The slot arrangement extends longitudinally of tubular valve 42 and includes slot portions 72 and 74 separated by a circumferential band 76. Band 76 is particularly desirable when the valve is of a relatively long length to provide resistance to flexure.

Spaced teeth 78 and 80 of slot portion 72 are separated by respective notches 82 and 84 as illustrated on blank 85 of FIGURE 8. Slot portion 74 has oppositely facing teeth 86 and 88 separated by respective notches 90 and 92. Such a dentate slot arrangement provides a generally uniform unloading pattern along the entire length of the metering valve.

It has been found desirable to have metering valves in lengths as great as around five feet. If a continuous slot defined by a smooth parallel surface of five feet in length were used, a rotation of the valve of one-half inch would expose 30 square inches of open slot area. With a dentate slot arrangement of around twelve teeth one inch in width along a metering valve, a rotation of 1 inch will result in an open slot area exposed to the lading of approximately 12 square inches uniformly disposed along the control valve. Thus, a greater control over the unloading of the lading is provided with a dentate slot arrangement.

However, even with a dentate slot arrangement, the fact that the pressure differential between the hopper structure and the metering valve is greater near the discharge or downstream end of the metering valve, indicated by the arrow of FIGURE 7, will cause the unloading to proceed at a faster rate at the discharge end of the valve than at the upstream end. This is undesirable since air will tend to flow directly from the hopper structure into the metering valve when the end of the metering valve adjacent the discharge end is removed of lading. This will reduce the unloading rate of the lading near the upstream end of the metering or control valve.

The slot area exposed at the upstream end of the control valve should exceed the slot area, if any, exposed at the downstream end of the control valve to compensate for the differential in pressure. This will enhance gravity flow near the upstream end to balance the increase of flow at the downstream end due to higher pressure differential. One manner of obtaining different slot areas exposed to lading at the upstream and downstream ends of the metering valve is the use of an offset slot pattern. In this manner two slot portions are machined into the metering valve, one portion being exposed during the initial stages of unloading near the upstream end of the valve. Then, after the material is unloaded at the upstream end, the valve is further rotated so that the slot area is exposed near the downstream end of the valve for unloading.

Portion 72 is offset relative to portion 74 with respect to the circumference of tube 42. Upon rotation of tube 42 in a counterclockwise direction as indicated by arrow F in FIGURE 6, slot portion 72 clears lip 46 before slot portion 74 and material is unloaded first from the upstream end of valve 42, slot portion 74 being on the downstream end of valve 42 with the direction of material flow indicated by the arrow in FIGURE 2. The exact position of slot portions 72 and 74 is dependent primarily on the pressure differential between the hopper structure and metering valve 42 which varies with factors, such as, for example, the particle size of the lading being unloaded and the rate of flow within valve 42. Slot portion 74 is offset around 1⅛ inches relative to slot portion 72 with respect to the outer circumference of valve 42 with valve 42, for example, having a length of around five feet, an outer diameter of 5½ inches and an inner diameter of 5 inches.

In operation, the downstream end of tube 42 after cap 65 is removed is connected to a suitable conveyng conduit having a pressure therein lower than the hopper structure with slot portions 72 and 74 communicating with space 48. Tube 42 is then rotated counterclockwise in direction F of FIGURE 6 to the first unloading position indicated in FIGURE 2 in which notches 82 clear lip 46 with teeth 78 being below lip 46. Lading is thus unloaded first adjacent the upstream end of valve 42.

Unloading is maintained with valve 42 in the position of FIGURE 2 until a drop in pressure occurs at which time valve 42 is rotated to the second unloading position shown in FIGURE 7. A drop in pressure normally occurs when the material over at least a portion of the slotted area is removed to permit air to be drawn directly into tube 42 and thereby effect a substantially immediate drop in pressure. In this position teeth 78 and notches 90 clear lip 46 so that lading is unloaded the length of valve 42. When only a relatively small amount of lading remains within outlet structure 26 with valve 42 in its FIGURE 7 position, valve 42 is further rotated counterclockwise in direction F so that the open slot area is disposed adjacent lip 44. In this position, any lading on side wall 30 moves primarily by gravity into valve 42 through slots 72, 74 where it is removed pneumatically to provide an effective cleanout of outlet structure 26.

In order to decrease any shearing action of particles between valve 42 and lips 44, 46, it is desirable to have the projecting tips of teeth 78, 80, 86 and 88 formed by converging surfaces which are slanted at an angle of around 20° with respect to longitudinal axis of valve 42 as indicated at K in FIGURE 7. Particles which are caught between the teeth and lips 44, 46 will tend to be cammed by the surface of the teeth to one side.

Figure 9:
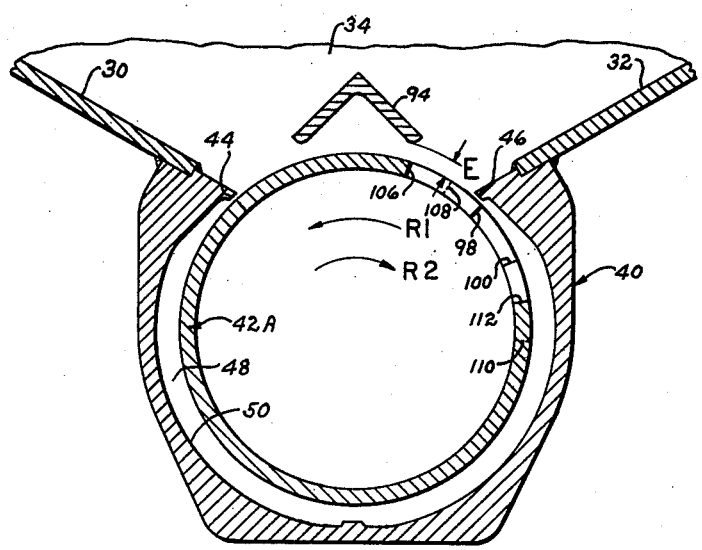
FIGURE 9 is a transverse section of a separate embodiment of metering valve in which a tapering slot arrangement is provided.

Referring particularly to FIGURES 9, 10 and 11, an embodiment of a metering tube or valve 42A having a different slot arrangement for varying the open areas at the downstream and upstream ends of the metering valve is illustrated. Also, to decrease the frictional contact between the lading within outlet structure 26 and valve 42A upon rotation of the tube, a hood 94 is positioned over metering tube 42A such as illustrated in FIGURE 9. Hood 94 is secured to end walls 34 and directs the flow of lading into the space between the hood and adjacent side walls 30 and 32. Hood 94 thus removes a portion of the weight of the lading from the tube thereby permitting tube 42A to rotate with a minimum of frictional contact with the lading. The spacing of hood 94 from walls 30 and 32 may, for example, be around 2 inches. In order that no binding takes place between hood 94 and tube 42A, hood 94 is spaced a distance E from tube 42A at least 5/32 inch. It is to be understood that hood 94 may also be employed with the embodiment of FIGURES 1–8, if desired.

Metering valve 42A presents an open slot area to the lading adjacent lips 44 and 46 which varies in size along the length of the metering tube thereby to meter the lading along the length of the tube. Blank 96 from which tube 42A is formed has teeth 98 and 100 which project progressively at different lengths from respective edges 102 and 104. Teeth 98 are separated by alternate long notches 106 and intervening short notches 108. Long notches 110 and intervening short notches 112 separate teeth 100. For example, tube 42A may be of a length of five feet with slot 106 adjacent end H offset one-half inch with respect to slot 106 adjacent end G as measured at Y in FIGURE 10. Long slot 106 adjacent end H is offset 1⅝ inches with respect to short slot 108 adjacent end H. Corresponding distances for slots 110 and 112 are indicated at B' and Y'. The offset between long notch 106 adjacent end H and short notch 108 adjacent end H is 1⅝ inches which permits all long notches 106 adjacent lip 46 to be opened at least 1⅛ inches when rotated in direction R1 before the opening of any of short notches 108, notches 106 being opened progressively farther from end G to end H. When tube 42A is rotated in direction R2 all the long notches 110 adjacent lip 44 are opened 1⅛ inches before the opening of any short notches 112, notches 110 being opened progressively farther from end H to end G. This arrangement of the teeth and notches provide a very effective unloading of the outlet structure in a minimum of time. It is to be understood that clearances B, C and D as illustrated in FIGURE 6 for metering tube 42 apply equally to metering tube 42A.

Operation of the embodiment of FIGURES 9–11 is as follows:

Unloading from end G, tube 42A is rotated counter-clockwise in direction R1 until a sufficient slot area is exposed above lip 46 so that particles fall in valve 42A at a suitable rate. When lading is removed over a portion of the valve 42A, air is admitted directly within the tube and the pressure will drop considerably.

At this time, it is necessary to move tube 42A to a first adjustment position in direction R1 as shown. This adjustment position occurs when long notch 106 nearest end H is opened 1⅝ inches with respect to lip 46 and long notch 106 nearest end G is opened 1⅛ inches with respect to lip 46 as shown in FIGURE 9, the circumferential distance between the deep portions of notches 106 at opposite ends of tube 42A being ½ inch as measured at Y. In this position since notch 106 adjacent end H is opened to a greater extent, a gravity flow of lading will be greater adjacent upstream end H than adjacent downstream end G. However, the pressure differential at downstream end G is greater than the pressure differential at upstream end H which compensates for the increased slot area at end H. With metering tube 42A in the position of FIGURE 9, substantially all of the lading along side wall 32 is uniformly unloaded.

It is then necessary to rotate tube 42A in an opposite direction R2 as shown in FIGURE 9 as a relatively small amount of lading usually remains along side wall 30. When the tube is rotated in direction R2, to a second adjustment position, the slotted area will be exposed above lip 44 with the deepest notches 110 adjacent end G. However, at this position, satisfactory flow of lading is accomplished along the entire length of the tube if notch 110 nearest end H is opened at least 1⅛ inches even though the pressure is less adjacent downstream end G. The lading adjacent side wall 30 is a relatively small amount as the majority of the material has been previously removed at the first position of tube 42A, shown in FIGURE 9, and only a relatively short period of time is required to complete the unloading operation. It is to be understood that in the event tube 42 is unloaded from end H instead of end G, valve 42A is first rotated in a clockwise or opposite direction as indicated at R2. Thereafter tube 42A is rotated in direction R1.

Referring to FIGURES 12 and 13, another embodiment of the metering valve is illustrated. Lips 44B and 46B are formed at the junctures of housing 40B and sides 30B, 32B. A shaft 116 extends longitudinally within housing 40B and is suitably mounted in supports at each end thereof. Extending between shaft 116 and a metering valve 42B is a web 118 connecting shaft 116 and valve 42B together for rotation. Web 118 may be provided with suitable openings 119 to permit air to flow therethrough. Valve 42B has teeth 120 formed along a side thereof adjacent lip 44B. Teeth 120 project progressively farther from end 122 to end 124 to provide a tapered irregular surface. Distances X and Y on FIGURE 13 are similar to distances X and Y on FIGURE 9. Metering valve 42B may be operated in a manner similar to the embodiment of FIGURES 9–11.

From the foregoing, it is to be understood that the present metering valve may be rotated with a minimum of resistance from the lading to be unloaded, even with metering tubes of relatively long lengths, such as lengths over three feet. A minimum amount of lading remains within outlet structure 26 after the unloading operation.

In view of the above, it may be seen that several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An outlet structure adapted to be secured beneath a hopper structure comprising a pair of oppositely facing side walls sloping downwardly toward each other in a generally smooth relation and having spaced lower portions at least one of which terminates in a lip, a pair of end walls connecting the sloping side walls for forming a generally trough shaped outlet structure, and a conduit structure extending between and below the spaced lower portions of said side walls to form a depressed trough bottom extending generally the length of the outlet structure in which lading is removed pneumatically from the outlet structure, said conduit structure including an elongate metering tube between the spaced lower portions of the side walls and rotatable in one direction from closed to at least two separate open positions for selectively discharging particles pneumatically from the outlet structure, said lip being closely spaced from the adjacent metering tube and forming a sealing edge generally parallel to the adjacent surface of the metering tube and extending longitudinally in a direction generally parallel to the rotational axis of said metering tube, said conduit structure being cut back adjacent said lip to define an increased clearance immediately below said lip whereby a restriction is provided between the sealing edge and adjacent metering tube, said metering tube having a generally longitudinally extending slot to permit entry of lading from the outlet structure into the conduit structure when the slot is positioned between said spaced lower portions, and a longitudinal edge defining a portion of said slot disposed generally adjacent said lip during pneumatic unloading and extending for at least a substantial portion of the length of said conduit structure, said longitudinal edge having a major portion thereof extending longitudinally at an angle to the longitudinal axis of the sealing edge so that upon rotation of said metering tube in one direction when said longitudinal edge is disposed generally adjacent said sealing edge a progressively increasing portion of the longitudinal edge clears the sealing edge to provide a progressively increasing slot area, the rotation of the metering tube in an opposite direction effecting a camming action against any lading at the restriction formed between the sealing edge and the longitudinal edge thereby to minimize binding of the metering tube thereat, said slot and longitudinal edge exposing during the unloading operation an open area between the lower portions having a length longitudinally of the metering tube which is substantially less at the first of said separate open positions than the other of said open positions thereby to minimize binding of the metering tube upon movement thereof in said one direction from closed position, the open position first reached from the closed position upon movement of the metering tube in said one direction having said open area of said lesser length as measured longitudinally of the metering tube.

2. An outlet structure as set forth in claim 1 wherein said lip forms a sealing edge generally parallel to the adjacent surface of the metering tube of a width between about 1/32 inch and ⅛ inch, the conduit structure being cut back adjacent said lip to a distance at least 3/32 inch from the adjacent surface of the metering tube.

3. An outlet structure adapted to be secured beneath a hopper structure comprising a pair of oppositely facing side walls sloping downwardly toward each other in a generally smooth relation and having spaced lower portions at least one of which terminates in a lip, a pair of end walls connecting the sloping side walls for forming a generally trough shaped outlet structure, and a conduit structure extending between and below the spaced lower portions of said side walls to form a depressed trough bottom extending generally the length of the outlet structure in which lading is removed pneumatically from the outlet structure, said conduit structure including an elongate metering member between the spaced lower portions of the side walls and movable between closed and open positions for selectively discharging particles pneumatically from the outlet structure, said elongate metering member having at least one toothlike projection disposed adjacent said lip, said lip spaced from the adjacent metering member a distance between about 1/64 inch and 1/8 inch and forming a sealing edge extending generally coaxially to the adjacent surface of the metering member, said sealing edge being of a width between about 1/32 and 1/8 inch, the conduit structure being cut back adjacent said lip to a distance at least 3/32 inch from the adjacent surface of the metering member.

4. An outlet structure adapted to be secured beneath a hopper structure comprising a pair of oppositely facing side walls sloping downwardly toward each other in a generally smooth relation and having spaced lower portions, means connecting the side walls to form a generally trough shaped outlet structure, and a conduit structure extending between and below the spaced lower portions of the side walls to form a depressed trough bottom in which particles are removed pneumtaically from the outlet structure, said conduit structure including an elongate metering member between the spaced lower portions of the side walls and rotatable in one direction about its longitudinal axis from closed to at least two separate open positions for selectively discharging particles pneumatically from the outlet structure, said metering member having at least one irregular surface disposed adjacent at least one of the side walls and extending for at least a substantial portion of the length of the conduit structure, said irregular surface being arranged and constructed to expose during the unloading operation an open area between the lower portions of said sides having a total length longitudinally of the metering member which is substantially less at the first open position reached upon rotation of the metering member in said one direction than at the second of said open positions which is subsequently reached thereby to minimize binding of the metering member upon movement thereof in said one direction from closed position, said irregular surface comprising a plurality of teeth spaced from each other in a direction generally along the longitudinal axis of the metering member and extending in a plane coincident with the path of rotation of said metering member.

5. An outlet structure adapted to be secured beneath a hopper structure comprising a pair of oppositely facing side walls sloping downwardly toward each other in a generally smooth relation and having spaced lower portions each of which terminates in a lip, a pair of end walls connecting the sloping side walls for forming a generally trough shaped outlet structure, and a conduit structure extending between and below the spaced lips of said side walls to form a depressed trough bottom extending generally the length of the outlet structure in which lading is removed pneumatically from the outlet structure, said conduit structure including an arcuate metering member between the lips rotatable about a longitudinal axis in one direction from closed to at least two separate open positions for selectively discharging particles pneumatically from the outlet structure, each lip spaced from the adjacent arcuate metering member a distance between about 1/64 inch and 1/8 inch to form a sealing edge generally parallel to the adjacent arcuate surface of the metering member of a width between about 1/32 inch and 1/8 inch, said conduit structure being cut back adjacent each lip to define an increased clearance immediately adjacent each lip, said metering member having at least one irregular surface disposed adjacent at least one lip and extending for at least a substantial portion of the length of the conduit structure, said irregular surface being arranged and constructed to expose during the unloading operation an open area between the lips having a total length longitudinally of the metering member which is substantially less at the first open position reached upon rotation of the metering member in said one direction than at the second of said open positions which is subsequently reached thereby to minimize binding of the metering member upon movement thereof in said one direction from closed position, said irregular surface comprising a plurality of projecting teeth spaced along the irregular surface longitudinally of the elongate metering member.

6. An outlet structure as set forth in claim 5 wherein the teeth project progressively farther in a direction transversely of the metering member from one end of the metering member to the other end thereof.

7. An outlet structure as set forth in claim 5 wherein the teeth adjacent one end of the elongate metering member are offset transversely of the metering member from the teeth adjacent the opposite end of the metering member.

8. An outlet structure as set forth in claim 5 wherein said teeth have generally pointed tips defined by converging surfaces extending about 20° or greater with respect to the longitudinal axis of the metering member thereby to aid in dislodging particles between the teeth and the adjacent lip.

9. An outlet structure adapted to be secured beneath a hopper structure comprising a pair of oppositely facing side walls sloping downwardly toward each other in a generally smooth relation and having spaced lower portions, an open bowl-shaped housing extending downwardly between the spaced lower portions of said side walls to from a depressed trough bottom, a generally cylindrical metering tube disposed within said depressed trough and having a slot extending longitudinally thereof to receive particles from the outlet structure for pneumatic unloading, said housing forming a juncture with each of said lower portions, each terminating in a lip spaced from the adjacent metering tube a distance not substantially exceeding 1/8 inch and forming a sealing edge generally parallel to the adjacent surface of the metering tube, said housing being cut back beneath each lip from the adjacent surface of the metering tube, and means to rotate said tube about its longitudinal axis to position the slot in the area between the lower end portions of said sides thereby to permit material to flow into the tube from the outlet structure for pneumatic unloading, said tube having a plurality of teeth defining at least one side of said slot and projecting generally at right angles to the longitudinal axis of the tube, each pair of adjacent teeth being separated by a notch extending generally at right angles to the longitudinal axis of the metering member.

10. An outlet structure as set forth in claim 9 wherein said teeth are arranged and constructed to expose during the unloading operation an open slot area between the lips adjacent the upstream end of the metering tube greater than the open slot area adjacent the downstream end of the metering tube, the metering tube being subjected to an airstream induced by a pressure adjacent the downstream end of the metering tube lesser than the pressure adjacent the upstream end thereof whereby the differential between the open areas compensates at least in part for the differential in pressure between the upstream and downstream ends of the metering tube.

11. An outlet structure as set forth in claim 10 wherein said longitudinally extending slot has at least two slot portions spaced from each other longitudinally of the tube, the teeth defining at least one side of each slot portion with the teeth adjacent one slot portion being offset with respect to the teeth adjacent the other slot portion relative to the circumference of the tube to form open slot areas of different sizes.

12. An outlet structure as set forth in claim 10 wherein the teeth project progressively farther in a direction transversely of the tube from one end of the tube to the other end thereof to form an open slot area adjacent one end of the tube greater than the open slot area adjacent the other end of the tube.

13. A covered hopper railway car having a hopper structure with surfaces funneling downwardly to a bottom opening, an outlet structure secured to the hopper structure beneath the bottom opening to receive finely-divided material, said outlet structure comprising a pair of oppositely facing side walls sloping downwardly toward each other in a generally smooth relation and having spaced lower portions at least one of which terminates in a lip, a pair of end walls connecting the sloping side walls for forming a generally trough-shaped outlet structure, and a conduit structure extending between and below the spaced lower portions of said side walls to form a depressed trough bottom extending generally the length of the outlet structure in which lading is removed pneumatically from the outlet structure, said conduit structure including an elongate metering member between the spaced lower portions of the side walls and movable in a transverse direction from closed to at least two separate open positions for selectively discharging particles pneumatically from the outlet structure, said lip being spaced from the adjacent metering member a distance not substantially exceeding ⅛ inch and forming a sealing edge extending generally parallel to the adjacent surface of the metering member, said conduit structure being cut back adjacent said lip to define an increased clearance immediately below said lip, said metering member having at least one irregular surface comprising a plurality of projecting teeth spaced along the irregular surface longitudinally of the elongate metering member, said teeth being arranged and constructed to expose during the unloading operation an open area between the lower portions having a total length measured longitudinally of the metering member which is substantially less at the first open position reached upon movement of the metering member in said transverse direction than at the second of said open positions which is subsequently reached thereby to minimize binding of the metering member upon movement thereof.

14. A covered hopper railway car as set forth in claim 13 wherein the teeth project progressively farther in a direction transversely of the metering member from one end of the metering member to the other end thereof.

15. A covered hopper railway car as set forth in claim 13 wherein the teeth adjacent one end of the elongate metering member are offset transversely of the metering member from the teeth adjacent the opposite end of the metering member.

16. An outlet structure adapted to be secured beneath a hopper structure comprising a pair of oppositely facing side walls sloping downwardly toward each other in a generally smooth relation and having spaced lower portions, means connecting the side walls to form a generally trough shaped outlet structure, and a conduit structure extending between and below the spaced lower portions of the side walls to form a depressed trough bottom in which particles are removed pneumatically from the outlet structure, said conduit structure including an elongate metering member between the spaced lower portions of the side walls and movable in one direction from closed to at least two separate open positions for selectively discharging particles pneumatically from the outlet structure, said metering member having at least one irregular surface disposed adjacent at least one of the side walls and extending for at least a substantial portion of the length of the conduit structure, said irregular surface being arranged and constructed to expose during the unloading operation an open area between the lower portions of said sides having a total length longitudinally of the metering member which is substantially less at the first open position reached upon rotation of the metering member in said one direction than at the second of said open positions which is subsequently reached thereby to minimize binding of the metering member upon movement thereof in said one direction from closed position, said irregular surface comprising a plurality of projecting teeth spaced along the irregular surface longitudinally of the elongate metering member, each pair of adjacent teeth being separated by a notch extending generally at right angles to the longitudinal axis of the metering member.

References Cited by the Examiner

UNITED STATES PATENTS

| | | | |
|---|---|---|---|
| 1,843,460 | 2/32 | Rosenberger | 302—36 |
| 2,650,726 | 9/53 | Aller et al. | 302—52 X |
| 2,858,165 | 10/58 | Oliver | 302—36 |
| 3,048,448 | 8/62 | Aller | 302—52 |

HUGO O. SCHULZ, *Primary Examiner.*

GERALD M. FORLENZA, *Examiner.*